Feb. 27, 1940.  W. H. FARNSWORTH ET AL  2,191,560
PREPARATION OF MAGNESIUM PRODUCTS
Filed May 10, 1937  2 Sheets-Sheet 1

INVENTOR
William H. Farnsworth and
BY Clair B. Martin
Maréchal & Hoe
ATTORNEYS

Feb. 27, 1940.   W. H. FARNSWORTH ET AL   2,191,560
PREPARATION OF MAGNESIUM PRODUCTS
Filed May 10, 1937   2 Sheets-Sheet 2

INVENTOR
William H Farnsworth and
BY Clair H. Martin
Maréchal & Noe
ATTORNEYS

Patented Feb. 27, 1940

2,191,560

UNITED STATES PATENT OFFICE 2,191,560

PREPARATION OF MAGNESIUM PRODUCTS

William H. Farnsworth and Clair H. Martin, Manistee, Mich., assignors to Morton Salt Company, Chicago, Ill., a corporation of Illinois Application May 10, 1937, Serial No. 141,634

3 Claims. (Cl. 23—201)

This invention relates to magnesium and to the recovery of magnesium products from brines.

It is a principal object of the invention to provide a highly satisfactory process which is simple in operation and economical in equipment for the production of magnesium products of predetermined controlled characteristics from brines of high concentration such as the inland brines obtained from salt wells.

It is a further object to provide a process for producing magnesium hydroxide as a continuous process and under controlled conditions to permit of securing a product of crystalline structure and having a suitably rapid settling rate to facilitate separation.

It is a further object to provide such a process for the production of magnesium hydroxide in form suitable for carbonation in the manufacture of magnesium carbonates.

Other objects and advantages will be apparent from the following description, the accompanying drawings, and the appended claims.

In the drawings—

Figure 1:
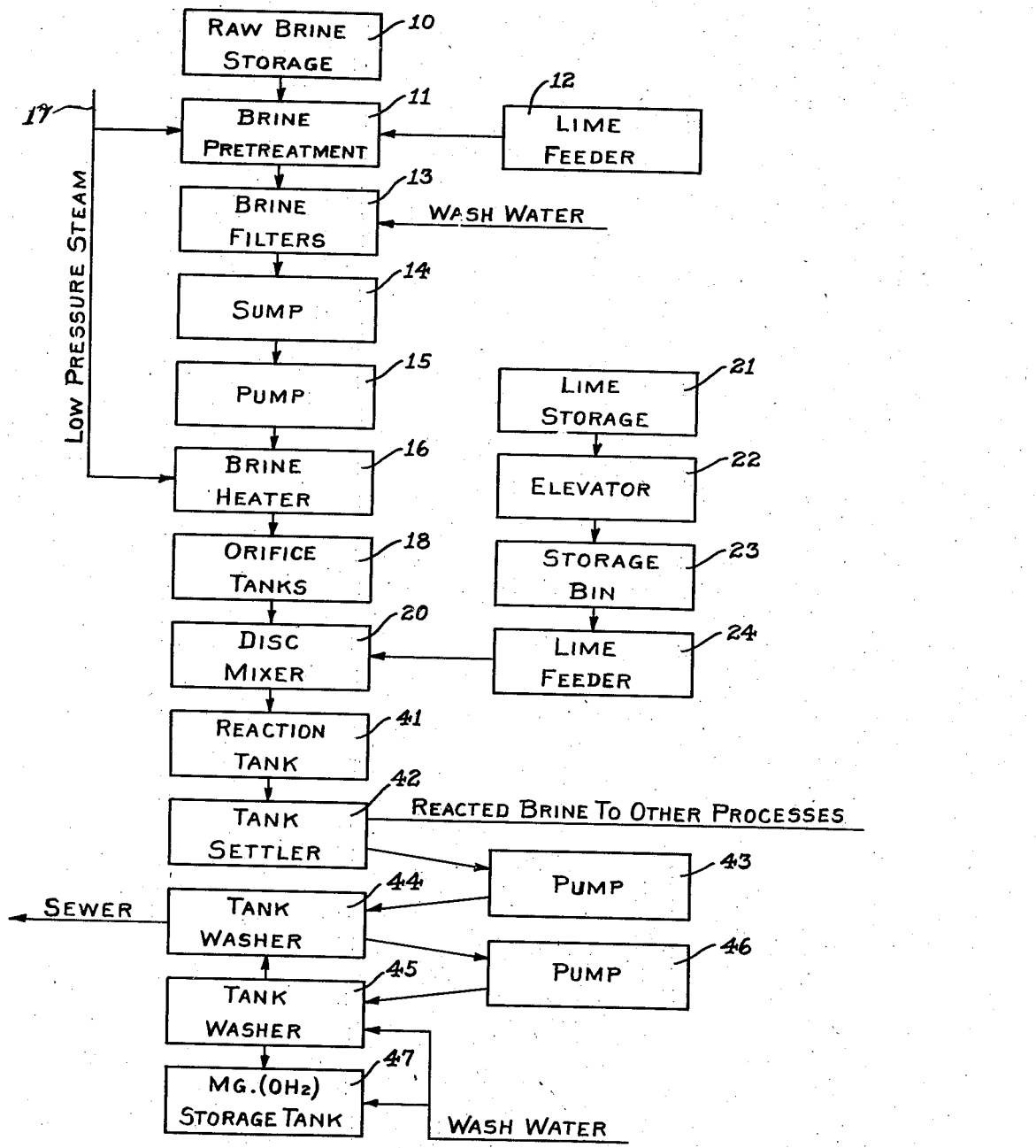
Fig. 1 is a diagrammatic representation of a flow sheet representing the operations which are carried out in accordance with this invention.

The present process has been developed more particularly for the production of magnesium compounds, such as magnesium hydroxide, carbonate, and the like, from inland brines of relatively high concentration, such as the brine obtained at Manistee, Michigan. In accordance with the present invention a suitable brine is subjected to a recovery process which is carried out as a continuous operation, thereby securing economy in the handling of the materials as well as in the equipment necessary for the process. The product of the present invention is found to have the desired crystalline character, facilitating settling, and to be substantially free of magnesium hydroxide in amorphous form, which impedes the settling and separation of the product. For commercial operating purposes it is desired to have a settling rate sufficiently rapid to permit of ready separation of precipitated magnesium hydroxide, and satisfactory settling rates of the order of four to six inches per hour are regularly secured by the present invention in plant scale operations. It has further been found that under the practicing of the present method a relatively reduced time of reaction as compared with prior processes is feasible while securing a superior product having the proper desired characteristics as to purity, particle size, settling rates and the like.

For a disclosure of the process, reference is made to the flow sheet where a storage tank for the raw brine is shown at 10, the brine being delivered therefrom at a constant and desired rate to a pretreatment tank 11. Here the brine is subjected to a pretreatment operation for the purpose of removing iron contained therein as it has been found that the brine has a tendency to pick up iron in previous processing or as a result of being conveyed through iron piping. In order to remove objectionable iron compounds a small amount of lime is added to cause precipitation. Lime is obtained from the lime feeder 12 which provides for introducing lime in the desired amount continuously into the pretreatment tank, satisfactory results having been secured with the addition of approximately one pound CaO per thousand gallons of brine. In order to speed up the reaction and to secure uniformity therein it is preferred to introduce steam into the tank 11 to effect the heating thereof to a constant temperature such as approximately 100° F. The iron precipitate so formed is then separated from the purified brine in any suitable manner.

As the purified brine is drawn from tank 11 it is passed through a filter system 13 preferably of the gravity type to which fresh wash water is supplied for use in back-washing the filters when necessary. Suitable flow regulating and controlling valves are provided to maintain a desired flow of brine through the system. The filtered brine passes to a sump 14 by gravity from which it is pumped by suitable pumping means 15 to a brine heater at 16. In order to secure formation of a magnesium hydroxide having the proper controlled characteristics, it is preferred to maintain the temperature of the brine at the time of reaction with the lime at such a point that formation of calcium oxychloride is inhibited or prevented. The presence of oxychloride is undesirable for the reason that when any condition is imposed on the system which causes the oxychloride to break down, the system then contains lime in solution and this reacts with magnesium chloride to produce an amorphous magnesium hydroxide. Formation of oxychloride in the system depends upon its solubility therein which may be determined for varying temperatures by reference to standard solubility tables. It is found that formation of the oxychloride is effectively inhibited when the temperature is raised above predetermined values. For commercial operations a suitable temperature has been found to be above approximately 105° F. and preferably of the order of 140° F. The heater 16 is of the continuous type and is provided with low pressure steam supply 17 and with suitable thermostatic control means controlling the rate of introduction of steam into the brine stream for maintaining a substantially constant temperature condition therein.

The heated brine is discharged into an orifice tank 18 which is arranged to have a constant head, and which is provided with a calibrated adjustable orifice outlet to assure constant and predetermined rates of flow therefrom.

The orifice tank is arranged to discharge directly and continuously into a brine lime mixer 20. Lime from the lime storage box 21 is raised by elevator 22 to storage bin 23 from which it is supplied as required to lime feeder 24. This feeder is of suitable construction to provide for feeding dry lime hydrate at a predetermined and constant rate directly into the disk mixer 20, for reaction therein with the brine. The lime utilized is in dry hydrate form, and preferably in finely divided particles; for example an air floated lime 95 to 98% of which will pass through a 200 mesh screen has been found satisfactory.

It is important in carrying out the invention as a continuous process that the rate of reaction of the lime and brine be controlled and regulated so that at no time in the system will it be possible for such quantities of brine and lime to be present in reactive intimacy as to result in the reaction going forward in excess of a predetermined rate. This rate is substantially the rate at which the magnesium hydroxide formed in solution phase exceeds the solubility of the solution and precipitates out of solution as a solid phase of crystalline characteristics. If the rate of reaction is properly controlled and limited so that magnesium hydroxide does not become available in solution at a rate in excess of the precipitation from solution in crystalline form, the formation of a product in amorphous form is avoided, and the desired rapid-settling crystals of magnesium hydroxide are secured. Such crystalline product is subject to relatively ready separation while the amorphous product is separated even from weak brines such as sea water with difficulty and its separation from the more concentrated inland brines becomes commercially quite impracticable.

In securing the desired limiting of the reaction, it has been found important to maintain control of the conditions of operation throughout the period of interaction of the brine and lime. The reaction between the magnesium chloride and the lime may be expressed as follows:

$MgCl_2 + Ca(OH)_2 + H_2O \rightarrow Mg(OH)_2 + CaCl_2 + H_2O$

For practical purposes this reaction should not be carried toward the right beyond a point which represents the extent to which it is economical to carry the reaction. In accordance with this invention, a lesser quantity of lime is added than the chemically equivalent amount, and the lime is brought into reactive intimacy with the brine only under such conditions that the lime is always present in an excess of brine. The brine contains the magnesium chloride in liquid phase in solution while the lime is primarily in solid phase. The lime, before it can enter into the reaction must pass through the solution phase, and its rate of availability for reaction thus is a function of the rate at which it dissolves into the solution. If as the lime becomes available for reaction, there is also present for reaction a sufficient quantity of brine, that is, a quantity in excess of that which it is theoretically possible to react under the existing conditions, the reaction will proceed in a controlled manner without the building up of undesirably high concentrations of lime in solution, and the reaction will proceed through the body of the brine under conditions which provide for proper precipitation of magnesium hydroxide in crystalline form. Where lime in solution form is added to the brine, the reaction is found to proceed at a rate in excess of the proper rate for production of crystals and magnesium hydroxide in amorphous form is secured. Thus it is important that the reaction be so controlled as to avoid the reaction of brine with substantial quantities or concentrations of lime in solution. For this reason it is important that the lime be uniformly distributed into the body of brine. This involves not only a uniform mechanical intermixing of the lime, but also the avoidance of the addition of lime in large size particles. Upon the addition to the brine of solid phase lime particles, the outer surface of each particle quickly goes into solution and a covering of magnesium hydroxide is formed over the particle which acts as a permeable membrane. The brine solution is slowly permitted to penetrate into the interior of the particle, for reaction with the lime, and also to effect solution of the lime which passes outwardly through the membrane. Where the particle of lime is quite small this process will proceed at a restricted rate until the reaction has been completed, but where a large particle of lime exists the outer film may burst, releasing a body of lime in solution which then reacts at a rapid and uncontrolled rate with the brine, resulting in formation of magnesium hydroxide of amorphous and non-crystalline character. It is thus important that lime of proper particle size be utilized in carrying out the process of this invention.

Prior art processes have included a seeding step in order to augment the rate of crystal growth in a batch process. The present invention secures improved results with elimination of such seeding process, by bringing the reacting materials into reactive intimacy only under conditions which are properly controlled throughout the period during which the reaction is in progress, thereby providing for securing a product of very much improved settling rate characteristics, and through the utilization of an efficient continuous processing. Thus a more economical process is provided and it is possible to secure and maintain control over the progress of the reaction in all of its stages and in all portions of the process cycle. Furthermore the elimination of seeding effects material reduction in the quantity of magnesium hydroxide in suspension in the concentrated brine, and thereby enables the more ready separation of the product while maintaining a desired high concentration in the remaining liquor for use in subsequent recovery processing. Where for example a concentrated inland brine is seeded with 50% to 100%, or even a lesser quantity of seed crystals, such additional quantity of material in suspension in the heavy brine makes it materially more difficult to effect separation of the resulting product without objectionably diluting the brine in the recovery operation.

Figures 2, 3:
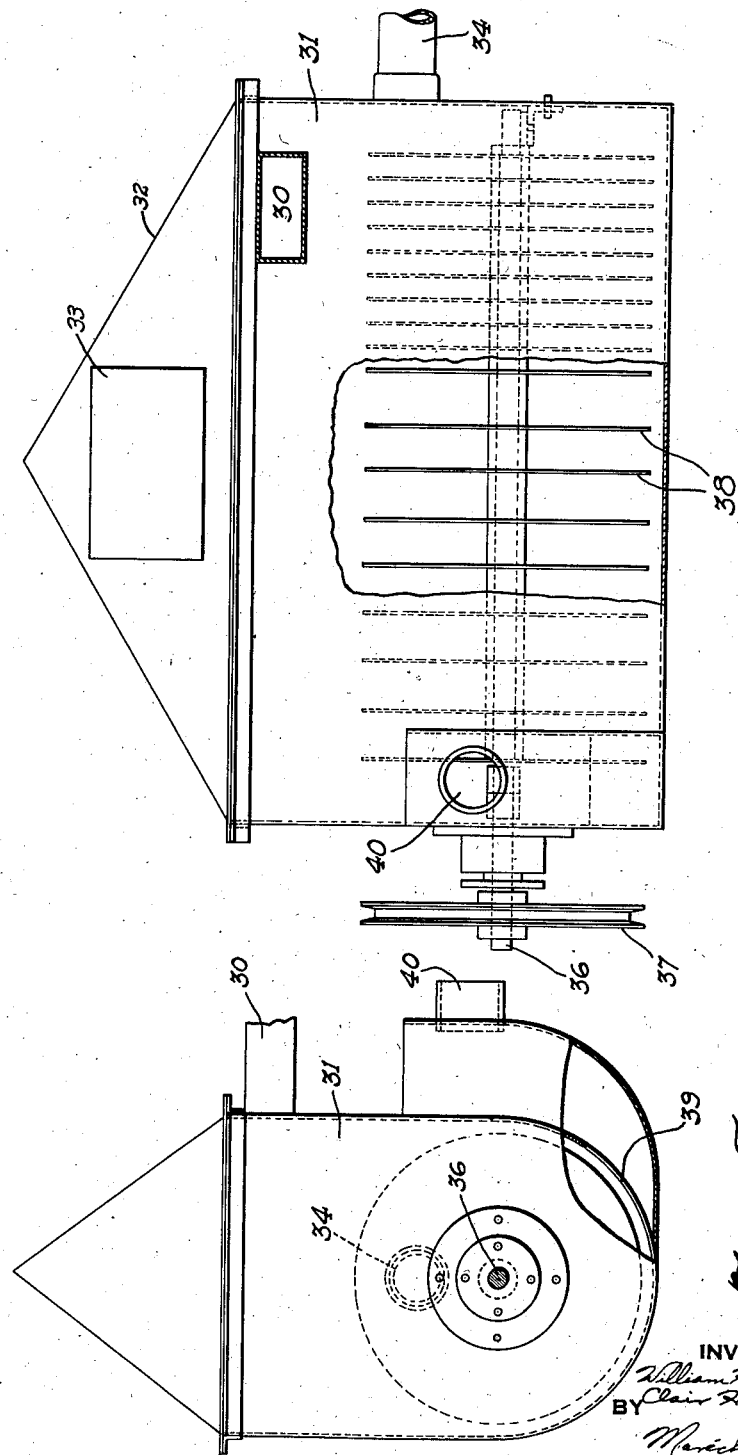
Fig. 2 is a sectional view of a mixer device suitable for use in conjunction with the practicing of the invention.
Fig. 3 is an end elevational view of the mixer device with parts thereof broken away to more clearly show the construction.

The brine is brought into reactive contact with the lime in the disk mixer 20 which provides for securing the proper control of the intermixing of the reacting materials. As shown in Fig. 2, this mixer is provided with a lime inlet 30 into which the dry lime in finely divided form is supplied from the lime feeder 24. Satisfactory results have been secured utilizing a magnetically vibrated conveyor trough or pan which conveys the finely divided lime from the feeder 24 and discharges it into the disc mixer inlet 30. The mixer is enclosed by top casing 32 and access to the interior is provided through an opening closed by cover 33. The lime enters the reaction tank 31 adjacent one end thereof and above the level of the liquid therein. The brine is fed into an inlet 34 at the controlled rate provided by orifice tank 18, and supplied to the reaction chamber adjacent the same end at which the lime is introduced. Within the reaction chamber means are provided to gently intermix the lime particles into reactive intimacy with the brine while avoiding such severe or violent agitation as to deleteriously break up the formed crystalline particles of magnesium hydroxide. As shown this means comprises a shaft 36, rotatably journaled in the end walls of the chamber and having a driving connection 37. On the shaft at spaced intervals are a series of relatively plane and smooth disk members 38 which are partially submerged and rotated in the body of liquid. The discs are preferably spaced closer together at the inlet end than at the outlet end as shown to facilitate their action in breaking the surface of the brine so that the lime particles wet as they touch the surface of the brine, avoiding agglomeration of the lime particles. The discharge outlet 39 is located at the remote end of the chamber at the lower side thereof and is extended up along the side of the tank to an outlet connection 40 located preferably adjacent or above the center of the tank, thereby determining the liquid level maintained in the tank. The slurry of partially reacted materials is continuously discharged into a reaction tank 41. This tank is of such a size in relation to the rate of flow that a controlled time of retention is provided, during which the reaction which started in the mixer is afforded sufficient opportunity to become complete, the reacted mixture of spent brine with magnesium hydroxide crystals in suspension therein being continuously flowed out of the retention tank.

The slurry consisting of magnesium hydroxide and reacted brine is continuously passed from the retention tank to a settling tank 42 where the reacted brine is continuously decanted, and withdrawn for use in other purposes. The tank is equipped with suitable thickener such as a Dorr thickener, and an internal launder around the top thereof for decanting the clarified brine. The tank thus serves to recover the brine in concentrated form for other uses and likewise to remove as much as possible thereof from the magnesium hydroxide prior to the washing operation.

From the bottom of tank 42 the thickened magnesium hydroxide is pumped by means of pump 43 to the washing tank 44, along with wash water from second wash tank 45. Tank 42 is likewise provided with a thickener and internal launder arranged for continuous decantation, the overflow from the launder being the wash water containing the chlorides and other solubles which have been washed from the magnesium hydroxide and being discharged to the sewer. The thickened magnesium hydroxide from this tank is pumped by pump 46 to the washing tank 45 to which fresh wash water is admitted through a constant level control means, adjustable for securing the desired flow. This tank 45 is also supplied with a launder, the overflow therefrom being supplied as wash water into tank 44. It will thus be clear that the precipitation and washing circuit is arranged for continuous operation and on countercurrent flow principles.

The product as delivered from washing tank 45 is supplied to a storage tank 47 as a substantially pure crystalline magnesium hydroxide product, free of calcium occlusions, and having the desired settling rates as previously described. It is suitable for use directly as magnesium hydroxide, or may be subjected to further processing to produce other magnesium compounds therefrom. It has been found that the magnesium hydroxide so produced forms a very satisfactory material for subjection to carbonation processes, in the manufacture of both normal and basic magnesium carbonates.

As a specific example of the carrying out of the process, brine as obtained at Manistee, Michigan from which bromine has been previously removed and which has approximately the following composition:

| | |
|---|---|
| Calcium chloride_____per cent__ | 13.84 |
| Magnesium chloride_____do____ | 8.62 |
| Sodium chloride_____do____ | 5.12 |
| Potassium chloride_____do____ | .61 |
| Specific gravity _____ | 1.26 | is subjected to the preliminary brine treatment at a temperature of 100° F., a lime slurry being added thereto in the proportion of one pound CaO per thousand gallons of brine. The resulting sludge product is removed, the brine filtered and passed through the continuous brine heater where steam is directly introduced into the flowing brine steam to raise its temperature to 140° F. The heated brine is flowed from the orifice tank into the disk mixer at a rate determined in accordance with the quantity of product desired to be made. This rate has varied from approximately 16 gallons per minute to 30 gallons per minute and in some cases up to 45 or 50 gallons per minute where a greater rate of production was desired.

A high calcium air floated lime screened so that 95 to 98% passes through a 200 mesh screen is supplied continuously into the disk mixer by a dry chemical feed means in an amount approximately 75% of that required to precipitate the magnesium available in the flowing brine stream. It is found that this percentage may vary somewhat, but should be kept below the point of chemical equivalence with the available magnesium, and preferably not in excess of about 75% to 80% of that amount. The time during which the materials remain in the disk mixer is about two minutes, and the time in the retention tank is approximately 20 minutes. A slow speed agitator operating continuously in the retention tank maintains a progressive flow and movement in the entire body of liquid therethrough assuring completion of the reaction by the time the product is discharged therefrom.

The suspension is then passed to the settler, where the concentrated reacted brine is withdrawn, magnesium hydroxide then transferred to the washers and finally into the storage tank where it is available for such subsequent use as desired. The product produced in accordance with this process was found to have a settling rate of approximately four to six inches per hour in the concentrated brine, making it highly satisfactory as a crystalline magnesium hydroxide product. The product secured was substantially free of calcium occlusions. Further the entire time of processing was found to be materially shortened in comparison with prior batch processes, and resulted in additional economy by way of elimination of unnecessary equipment required in a batch process.

While the process herein described constitutes a preferred embodiment of the invention, it is to be understood that the invention is not limited to this precise process, and that changes may be made therein without departing from the scope of the invention which is defined in the appended claims.

What is claimed is:

1. The process for the production of magnesium hydroxide in crystalline form and having a high settling rate from high concentration inland brine containing magnesium chloride which comprises continuously flowing a stream of said brine, continuously adding thereto a flow of lime in solid phase and of fine particle size, and controlling the relative rates of flow of brine and dry lime to provide for bringing the lime into reactive contact with the brine in predetermined controlled proportion less than the chemically equivalent quantity thereof, said lime particles receiving a surface film of magnesium hydroxide thereon which acts as a permeable membrane and restricts the rate at which the lime passes into liquid phase thereby delaying the rate of reaction between the lime and the brine, gently agitating the mixture of brine and lime to maintain the brine continuously in the presence of liquid phase lime in excess of the chemically equivalent quantity thereof while avoiding the breaking up of formed crystals of magnesium hydroxide, continuously flowing the intermixed brine and lime through a reaction tank to provide a controlled time of retention for completing the reaction, and thereafter separating the formed crystals of magnesium hydroxide from the brine to provide such rapid settling crystalline magnesium hydroxide.

2. The process for the continuous production of magnesium hydroxide in the form of crystals having a settling rate of the order of 4 to 6 inches per hour and substantially free of magnesium hydroxide in amorphous form from a brine of relatively high concentration such as one having a specific gravity of 1.26 and containing dissolved magnesium and other chlorides in solution therein which comprises the steps of heating a flowing stream of such brine to a temperature of approximately 105° F. to 140° F., continuously feeding dry lime hydrate of small particle size into said stream of brine in the absence of seed crystals and in predetermined correlated proportion with respect to the brine to provide for limiting the reaction rate so that the formed magnesium hydrate does not become available in solution at a rate in excess of the precipitation of crystals of magnesium hydroxide from solution in the concentrated brine, the rate of feeding of said dry lime hydrate being regulated to approximately 75% to 80% of the chemically equivalent quantity of the available magnesium in the flowing brine stream, gently intermixing the brine and the dry lime hydrate under such conditions as to secure intimate intermixture thereof while avoiding deleterious breaking up of the formed crystalline particles of magnesium hydroxide, continuously flowing the intermixed brine and lime through a reaction tank to provide a controlled time of retention for completing the reaction, and thereafter separating the formed crystals of magnesium hydroxide from the brine to provide such rapid settling crystalline magnesium hydroxide.

3. The process for the production of magnesium hydroxide in crystalline form and having a high settling rate from high concentration inland brine containing magnesium chloride which comprises flowing a stream of the brine to be reacted through a mixing vessel at a predetermined rate to provide a controlled volumetric flow of brine therethrough, introducing the entire quantity of lime to be reacted with the brine into the brine flowing through the mixing vessel at a predetermined quantitative rate to add the dry lime hydrate into the flowing brine for each volumetric unit of said brine in proportion less than the chemically equivalent quantity of the available magnesium in the brine such that the brine is present in reactive excess thereover, gently intermixing the brine and the lime in said mixing vessel to disseminate the lime throughout the stream of brine in said predetermined proportions and withdrawing the resultant flowing mixture from said mixing vessel prior to completion of the reaction, flowing the withdrawn intermixed brine and lime through a reaction tank while maintaining substantially the same originally predetermined proportions therein of brine to lime and controlling the time of retention in said reaction tank of the lime in the presence of the excess of brine for completion of the reaction to form a negative reaction product effectively separable therefrom at a high settling rate of the order of 4 to 6 inches per hour, and thereafter separating the formed crystals of magnesium hydroxide from such reacted brine by settling to provide such crystalline magnesium hydroxide.

WILLIAM H. FARNSWORTH.
CLAIR H. MARTIN.